United States Patent [19]

Scaife

[11] 4,142,758
[45] Mar. 6, 1979

[54] SAFETY AND AIR DEFLECTOR

[76] Inventor: Richard H. Scaife, R.D. Box 302C, Philipsburg, Pa. 16693

[21] Appl. No.: 851,459

[22] Filed: Nov. 14, 1977

[51] Int. Cl.² ............................................. B60J 1/60
[52] U.S. Cl. ..................................... 296/91; 296/1 S
[58] Field of Search ................................. 296/1 S, 91

[56] References Cited

U.S. PATENT DOCUMENTS

| 2,790,676 | 4/1957 | McMurray | 296/91 |
| 3,015,517 | 1/1962 | Thornburgh | 296/91 |
| 3,862,777 | 1/1975 | Schitano | 296/91 |
| 4,040,656 | 8/1977 | Clenet | 296/91 |
| 4,052,099 | 10/1977 | Lowery et al. | 296/91 |

Primary Examiner—Richard A. Bertsch
Attorney, Agent, or Firm—Thomas E. Sterling

[57] ABSTRACT

This invention is comprised of a transparent deflector shield, means for mounting said transparent shield in the forward portion of a vehicle so as to interrupt the wind currents passing therethrough and deflect them over the windshield of the vehicle.

6 Claims, 8 Drawing Figures

SAFETY AND AIR DEFLECTOR

This invention relates to deflectors and in particular to air deflectors mounted upon a moving vehicle.

The windshield of a moving vehicle, such as a car, or truck, frequently becomes dirty, soiled, caked and damaged because of objects which strike it. Most vehicles with windshields have, in driving, encountered rain, snow, dust, stones, and other objects striking the windshield and, in some cases, obscuring vision for those looking through it. The present invention provides an air deflector shield which will cause the air currents directly in front of the windshield to deflect and carry away such particles of matter to a point above or around the windshield. Thus a driver proceeding in a dirty atmosphere will find that dirt and other polluting particles will not strike his windshield at all, leaving it clear and clean to see through.

The air deflector of this invention may be mounted on the forward portion of the hood in the normal passenger car or truck and extend several inches above it. If the car or truck has a vertical front surface, the deflector is mounted one or two inches below the windshield at approximately a 45° angle to the vertical surface. This angle may be varied from 5° to 90° depending on the particular vehicle on which it is mounted. The shield is mounted upon the vehicle by mounting brackets which are screwed into the body of the vehicle. The angle made by the shield and its mounting surface may be adjusted by bending the mounting brackets appropriately. The Safety and Air Deflector is constructed of heavy gauge plastic, securely mounted in a polished aluminum base attached to the cowl of a vehicle below the windshield at a fixed angle, and provides improved frontal visibility in most weather conditions. The improved visibility provided by the Safety and Air Deflector is obtained as shown in the accompanying drawings.

As the vehicle accelerates, wind currents develop that are directed upward and outward over the frontal area of the windshield by the deflector. This wind current causes most insects, road spray, as well as small objects to be deflected over and around the windshield. This results in less use of windshield washer solvent, less wear on the windshield wiper blades and components as well as an added safety feature in motor vehicle operation and the results in improved visibility in adverse conditions.

An object of this invention is to provide a safety and air deflector shield positioned on the forward portion of a vehicle which will deflect the air stream around the windshield.

Another object of this invention is to provide an air deflector which will direct dirt, stones, snow and rain so that they do not strike the windshield of the moving vehicle.

Still another object of this invention is to provide an air deflector mountable upon the vertical surface of a tractor truck.

Yet another object of this invention is to provide an air deflector mountable upon the forward portion of the hood of a conventional truck or automobile.

Another object of this invention is to provide a transparent air deflector which is easy to see through.

These and other objects of the invention will become apparent upon examination of the following Figures, Specification and Claims, in which:

Figure 1:
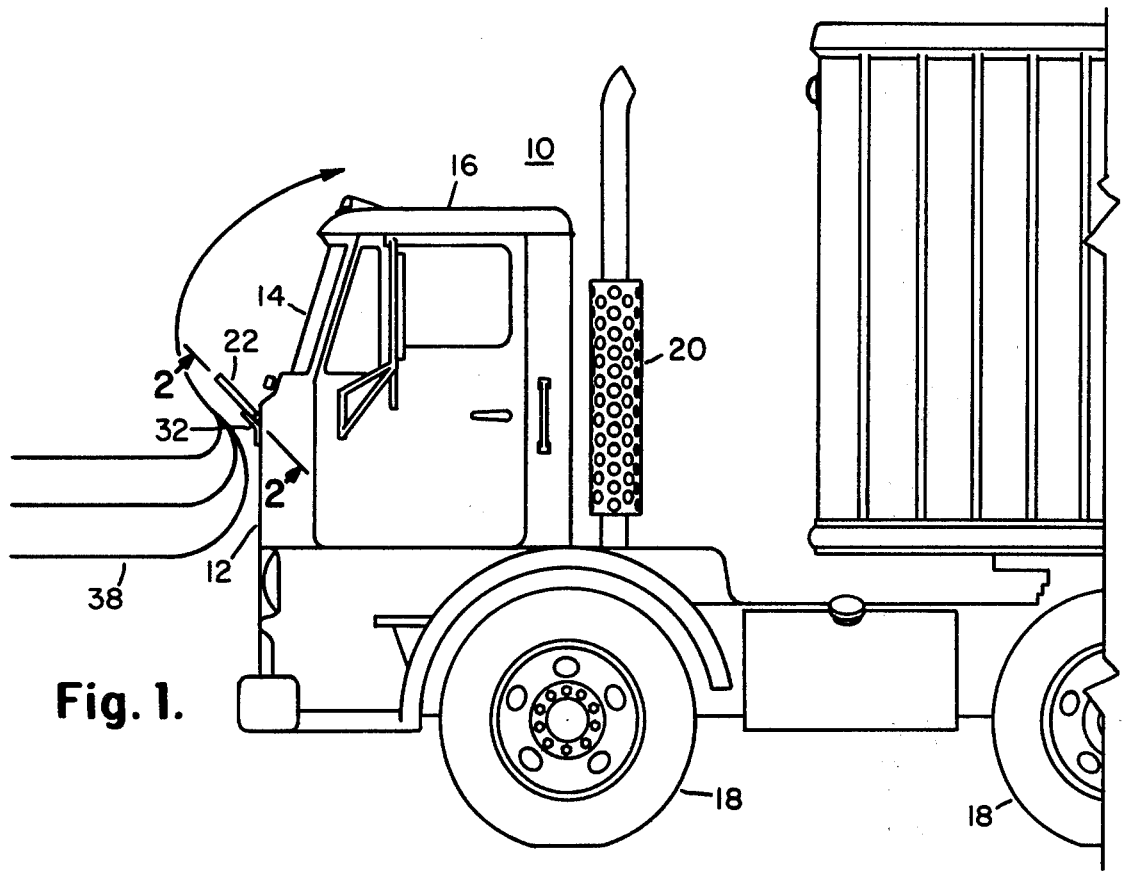
FIG. 1, is a side view of a tractor truck having a vertical front surface showing the Safety and Air Deflector shield invention mounted on the front surface thereof.
Figure 2:
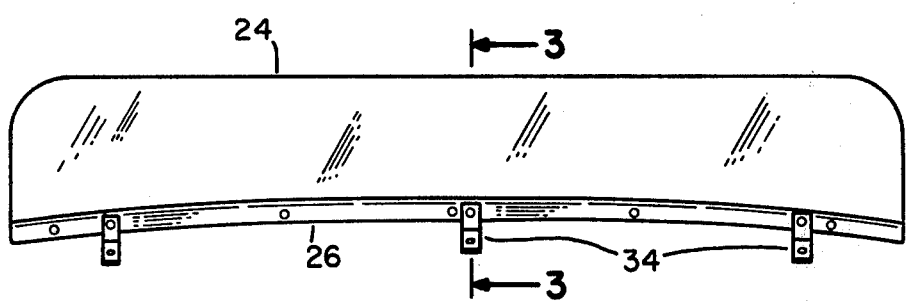
FIG. 2, is a front view of the air deflector of this invention which is mountable upon the tractor truck of FIG. 1.
Figure 3:
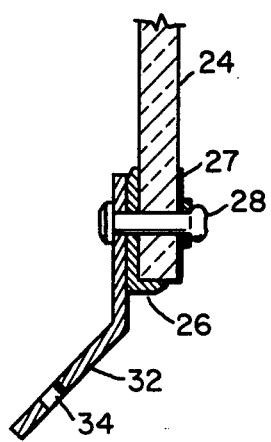
FIG. 3, is a partial cross-sectional view of the mounting bracket assembly taken along line 3—3 of FIG. 2.
Figure 4:
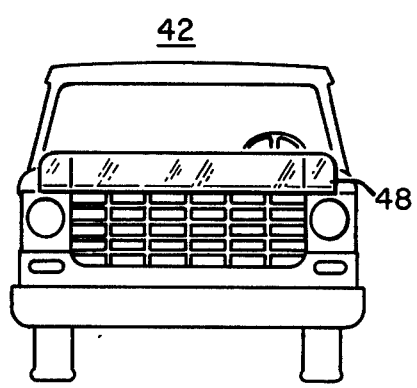
FIG. 4, is a front view of the air deflector of this invention mounted upon a conventional truck.
Figure 5:
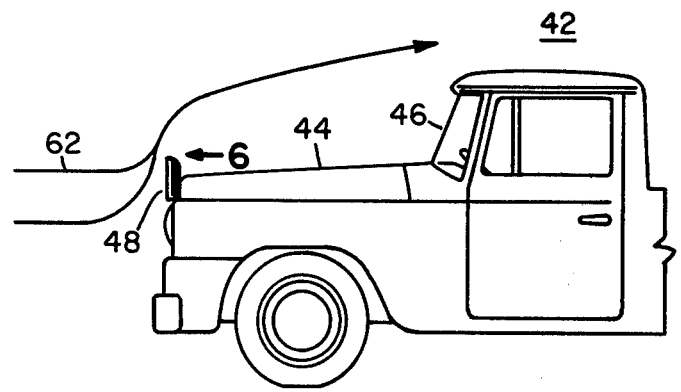
FIG. 5, is a side view of a conventional truck showing the air deflector of this invention mounted on the hood.
Figure 6:
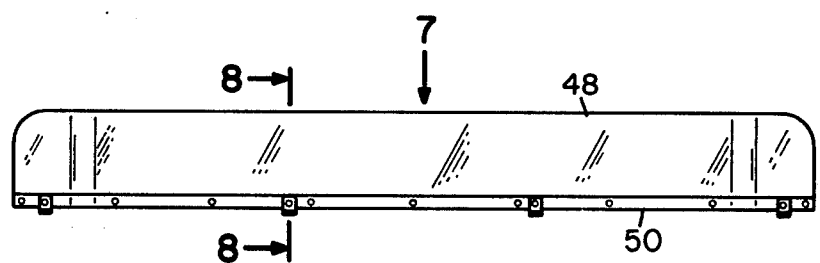
FIG. 6, is a back view of the deflector as seen from the cab of the truck.
Figure 7:
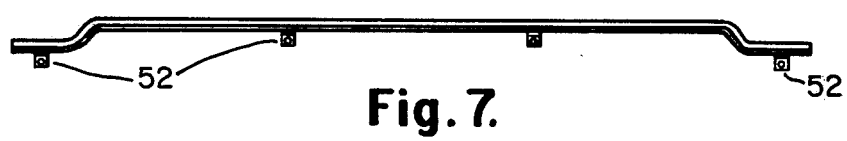
FIG. 7, is a top view of the deflector taken of FIG. 6.
Figure 8:
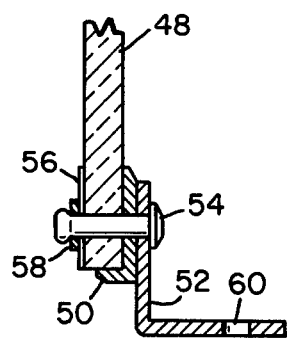
FIG. 8, is a partial cross-sectional view of the mounting bracket assembly taken along line 8—8 of FIG. 6.

Referring to the drawings and in particular to FIGS. 1 and 2, 10 represents a conventional tractor truck, having a vertical front surface 12. Windshield 14 is positioned above front surface 12 in the front portion of cab 16. Truck 10 has wheels 18 rotably attached thereto and exhaust system 20 extending from the engine (not shown).

Deflector 24 is of a general rectangular shape approximately 36" long and 6" high and is made of a generally transparent material such as plexi-glass or the like. An aluminum reinforcing strip 26 is positioned on the edge portion of the deflector 24 on the opposite of which is positioned a cushioning tape 27. Rivet 28 passes through a mounting bracket 32, reinforcing strip 26, deflector 24, cushioning tape 27 and a washer 30, to hold reinforcing strip 26 in place. Mounting bracket 32 has a screw hole 34 therethrough for attachment to front surface 12. In practice, three mounting brackets 34 are used to secure deflector 24 to surface 12.

Referring now to FIG. 1, deflector 24 is positioned on the front surface 12 of tractor truck 10. Metal screws (not shown) pass through screw hole 34 and into flat surface 12, thus holding deflector 24 1" or more below windshield 14 with the deflector 24 at about a 45° angle to vertical front surface 12 and extending outwardly therefrom. This angle may be adjusted by bending mounting brackets 32. Angles of 30° to 60° to the vertical have been found most satisfactory, although angles of from 5° to 90° are possible.

In operation, when tractor truck 10 proceeds in a forward direction, an air stream 38 strikes the forward portion of flat surface 12. It is deflected by flat surface 12 and by deflector 24 in an upward curving direction sufficient so that the air stream 38 passes over the front surface of the windshield 14 without striking it. Any dirt, stones, rain or snow in the air stream 38 will likewise be deflected around the windshield 14 and thus not strike it. As may be seen, any dust, debris, snow or rain will be deflected around the windshield 14, leaving it clean and dirt free.

Windshield 14 may have two deflectors 24 mounted thereon, one in front of the driver's windshield and one in front of the passenger's windshield. The angle that the deflector 24 makes with the front surface 12 may be adjusted for the particular speed range of the tractor truck 10 to insure that the air stream 38 passes above the windshield 14.

The deflector 24 is easily installed and removed, and may be positioned on almost any truck with a vertical front surface.

It is within the contemplation of this invention that deflector 24 may be used on other moving vehicles, such as motorcycles, bicycles, boats, airplanes, gliders and the like.

Referring now to FIGS. 4-8 inclusive, a modification of this invention is set forth to allow mounting on the hood of a conventional truck, 42 represents a conventional truck having a forward hood portion 44 in the front portion thereof and a windshield 46 above said hood 44.

A transparent deflector 48 of approximately rectangular shape has attached to the bottom portion thereof a reinforcing strip 50 which is attached to a mounting bracket 52. The number of mounting brackets may be one or more, four being most satisfactory. A rivet 54 passes through the mounting bracket 52, reinforcing strip 50, deflector 48, cushioning tape 56 and washer 58, whereby the mounting bracket 52 is secured to said deflector 48. Mounting bracket 52 is of general right angles having a mounting hole 60 therein adapted to be secured to the hood 44. In practice, four mounting brackets 52 are used to secure deflector 48 to hood 44.

A metal screw (not shown) extends through mounting hole 60 and into the front bottom portion of hood 44, thus securing deflector 48 in a substantially vertical position. Deflector 48 is mounted so as to extend from 1" to 6" above the top surface of hood 44, with 4" the generally preferred height. In operation when the truck 42 is driven, slip stream 62, comprised of air striking deflector 48, is deflected upwardly and over hood 44 and windshield 46. Any dust, dirt, snow, rain, bugs or other debris carried in the slip stream 62 will thus pass over the top or around windshield 46 and will not strike it.

It is within the contemplation of this invention that deflector 48 may be raised or lowered by lengthening or shortening mounting bracket 52 and an adjustment made whereby the slip stream 62 passes over the windshield 46 carrying dirt and debris with it. Alternatively, the height of deflector 48 may be adjusted by bending mounting brackets 52.

As may be seen, deflector 48 is made of a transparent material such as plexi-glass, enabling the operator of a vehicle to see through deflector 48 whereby his vision is not obscured.

I claim:

1. A windshield deflector mountable upon a substantially vertical forward portion of a vehicle, comprising in combination:
   a transparent shield;
   a mounting bracket integrally attached to said transparent shield by attachment means;
   attachment means comprising in combination:
      a reinforcing strip adjacent to said mounting bracket and adjacent to said transparent shield;
      cushioning tape adjacent to said transparent shield;
      a washer adjacent to said cushioning tape;
      a rivet extending through said mounting bracket, reinforcing strip, cushioning tape and washer;
   means for attaching said adjustable mounting bracket to the forward portion of said vehicle.

2. The combination as claimed in claim 1, in which said mounting bracket is adjustably bendable to position said transparent shield from 0° to 60° to the surface upon which it is mounted.

3. The combination as claimed in claim 2, in which said means for attaching said mounting bracket to said vehicle is a screw.

4. The combination as claimed in claim 3, in which said vehicle has a substantially horizontal hood portion thereon;
   said transparent shield extends substantially the width of said vehicle.

5. The combination as claimed in claim 4 in which said transparent shield substantially covers the front portion of said hood.

6. The combination as claimed in claim 5, in which said transparent shield is comprised of:
   a center portion which conforms to the configuration of said hood;
   two end portions extending rearwardly from said center portion, conforming to said hood.

* * * * *